(12) United States Patent
Lindberg et al.

(10) Patent No.: US 6,778,620 B1
(45) Date of Patent: Aug. 17, 2004

(54) METHOD AND AN ARRANGEMENT FOR PREVENTING METASTABILITY

(75) Inventors: Lars Olof Mikael Lindberg, Täby (SE); Lars Johan Vilhelm Fritz, Tumba (SE); Anna Carolina Sigrand, Trängsund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 742 days.

(21) Appl. No.: 09/588,599

(22) Filed: Jun. 7, 2000

(30) Foreign Application Priority Data

Jun. 8, 1999 (SE) .............................................. 9902150

(51) Int. Cl.[7] ............................ H04L 7/00; H04L 7/033
(52) U.S. Cl. ...................... 375/371; 375/372; 375/373; 375/354; 713/503
(58) Field of Search ................................. 375/223, 371, 375/372, 354, 373, 376, 375, 374; 713/543, 503; 370/223, 503

(56) References Cited

U.S. PATENT DOCUMENTS

| 4,525,849 A | * | 7/1985 | Wolf ........................ 375/372 |
| 5,034,967 A | * | 7/1991 | Cox et al. .................. 375/373 |
| 5,602,878 A | * | 2/1997 | Cross ........................ 375/354 |
| 5,764,710 A | * | 6/1998 | Cheng et al. ............... 375/371 |
| 5,867,695 A | * | 2/1999 | Amini et al. ............... 713/503 |

FOREIGN PATENT DOCUMENTS

| EP | 0436371 | * | 7/1997 | ........... G04F/10/00 |
| GB | 2262415 | * | 6/1993 | ............. H04L/7/00 |

OTHER PUBLICATIONS

Katz, Randy H. "Metastability and Asynchronous Inputs", *Contemporary Logic Design*, Benjamin Cummings/Addison Wesley Publishing Company, 1993.

* cited by examiner

*Primary Examiner*—Chieh M. Fan
*Assistant Examiner*—Edith Chang

(57) ABSTRACT

A system and method of preventing metastability in conjunction with the receipt in a first clock domain of an asynchronous digital signal from a second clock domain when the first domain operates with a first clock frequency, and the second domain operates with a second clock frequency that is known within the first domain. The first domain sends information to the second domain, and includes a reference signal containing phase information known in the first domain. The information is clocked into the second domain utilizing the reference information. The second domain then sends the asynchronous digital signal to the first clock domain. A receiving unit in the first domain determines the phase information from the received signal with a known degree of maximum uncertainty that is less than one period of the reference signal. The first domain then stably reads the received asynchronous digital signal.

22 Claims, 3 Drawing Sheets

METHOD AND AN ARRANGEMENT FOR PREVENTING METASTABILITY

This application claims priority under 35 U.S.C.§§119 and/or 365 to 9902150-3 filed in Sweden on Jun. 8, 1999; the entire content of which is hereby incorporated by referenced.

FIELD OF INVENTION

The present invention relates to a method and to an arrangement for preventing metastability in conjunction with the receipt of an asynchronous signal in a first clock domain that has a first clock frequency from a second clock domain that has a second clock frequency.

DESCRIPTION OF THE BACKGROUND ART

When an asynchronous digital signal is received in one clock domain from another clock domain, it is possible that metastability will occur in receiving circuits, meaning that the output value from receiving circuits cannot be relied upon.

In simpler terms, it can be said that metastability occurs when the switch between two states of the incoming signal takes place during the active edge of the clock that clocks the receiving flip-flop.

Reference is made to the publication "Contemporary Logic Design" by Randy H. Katz at the University of California, published 1993 by Benjamin Cummings/Addison Wesley Publishing Company, with particular reference to the chapter bearing the title "Metastability and Asynchronous Inputs", this chapter being accessible on the Internet via the following URL:
http://http.cs.berkeley.edu/~randy/CLD/chapter6/chapter06.doc4.html The method most used to overcome problems with metastability is to receive the signal via two mutually sequential flip-flops, which causes metastability to die out between the flip-flops.

Another solution is to use a flip-flop and a clock frequency that is sufficiently low to allow the metastability to settle during a clock cycle or a clock period of the clock frequency used. The problems with metastability increase with higher transfer times.

At sufficiently high transfer speeds, a clock period is of such short duration as to prevent metastability from dying out during a clock period. In addition to not knowing whether the received signal is correct or not, it is also uncertain whether or not metastability is able to spread to following circuits and so on through a receiving system.

Several ways of solving the specific problems relating to transmission between two clock domains that have mutually different clock frequencies are known to the art.

Patent Publication U.S. Pat. No. 5,867,695 describes a method and a system adapted to provide communication between units that function with mutually different clock frequencies. Periods during which metastability can occur are determined by evaluating clock frequency differences. Data transmitted from one unit to the other is processed continuously.

Data is received via a special process during periods in which metastability can occur, while data is received directly in other periods. The special process comprises clocking-in data via two mutually sequential flip-flops.

Patent Publication U.S. Pat. No. 5,602,878 also describes how information is received via double flip-flops when there is a danger of metastability occurring, this information otherwise being received directly.

Patent Publication U.S. Pat. No. 4,525,849 describes the possibility of receiving information sent from one clock system to a receiving, independent asynchronous clock system with the aid of a buffer in coaction with different synchronisation circuits.

Patent Publication GB-A-2 262 415 describes a method and an apparatus with which a handshake process is used, thereby enabling two different systems operating in different clock domains to determine when information can be transmitted without risk of metastability occurring.

Patent Publications EP-A2-0 436 371 and U.S. Pat. No. 5,764,710 are further documents that deal with metastability problems.

It should also be mentioned that metastability is, in itself, energy consuming, due to the fact that metastable flip-flops switch between two states or modes, which requires energy.

The traditional solution of using two mutually sequential flip-flops is also energy consuming, because it utilises two flip-flops instead of one.

SUMMARY OF THE PRESENT INVENTION

Technical Problems

When considering the present standpoint of techniques as described above, with a starting point from a method or an arrangement used in conjunction with receiving an asynchronous digital signal in a first clock domain that operates with a first clock frequency and which is derived from a second clock domain that operates with a second clock frequency, wherein said second clock frequency is known within the first clock domain, wherein a reference signal is available within the first clock domain, and wherein phase information from said reference signal is available in the second clock frequency, although with some uncertainty, it will be seen that a problem resides in finding a possibility of receiving said signal without risking the occurrence of metastability among receiving circuits in the first clock domain.

This is a particular problem from a technical aspect when the first clock frequency is so high that any metastability that may occur is unable to die out during a single clock period of the clock frequency in the first clock domain, which does not only result in an unreliable signal from a metastable circuit but also that the metastability can spread into other circuits in the first clock domain.

Another technical problem is one of defining a safe time period during which the received signal can be read without the risk of metastability.

A further technical problem resides in utilising the known relationship between the reference signal and the second clock frequency in order to find such a safe time period.

Yet another technical problem resides in realising how a reference signal or a clock frequency for the second clock domain can be generated on the basis of the aforesaid solution to generating said safe period.

When the first clock frequency is higher than the second clock frequency, a technical problem also resides in providing continuous access to the value of the received signal during a full period of the second clock frequency, even when the duration of the secure time period corresponds, e.g., to one period of the first clock frequency.

Solution

With the intention of solving one or more of the aforesaid technical problems, the present invention takes as its starting point a method, or an arrangement, for preventing metastability in conjunction with the receipt of an asynchronous digital signal in a first clock domain that operates with a first clock frequency, wherein said received signal is derived from a second clock domain that operates with a second clock frequency, wherein the second clock frequency is known within the first clock domain, wherein a reference signal having phase information that is known in the first clock domain is used as a clock frequency reference in the second clock domain, and wherein the phase information is found available in the received signal with a certain degree of uncertainty.

With the intention of enabling the value of the received signal to be read safely without risk of said signal causing metastability, it is proposed in accordance with the invention that the received phase information, having said uncertainty, is used to read the received signal in a stable fashion.

According to the present invention, a reference signal can be generated in the first clock domain. This reference signal may comprise a third clock frequency that is used when transferring information from the first clock domain to the second clock domain, wherewith the information is also transferred from the reference signal to the second clock domain. The uncertainty in the phase information in the received signal resides in the uncertainty in the phase relationship between the second clock frequency and the third clock frequency.

The first clock frequency is higher than the third clock frequency and each period of the third clock frequency shall, in accordance with the invention, be divided into a first and a second part. The first part is corresponded at least by the uncertainty and begins each period, while the second part comprises the remainder of each period. The received signal is read during a specific period of the first clock frequency that falls within the second part of each said period.

The known relationship between the second and the third clock frequencies, in other words the magnitude of the uncertainty in the phase difference, thus enables a safe time period to be obtained for reading the received signal, this time period being the second part of one period of the third clock frequency.

By generating a pulse during the specific period of the first clock frequency, it is possible to use this pulse to indicate when it is safe to read the received signal.

According to the invention, a counter is used to count through a number of states that corresponds to the number of periods that the first clock frequency has time to pass through during one period of the third clock frequency, and that the pulse shall be generated during a predetermined state of the counter.

According to one known technique, the clock frequency operative in the second clock domain may be obtained from the first clock domain by reduction of the first clock frequency. According to the invention, this can be achieved by using the reference signal, and therewith the third clock frequency, as a reference for the clock frequency in the second clock domain, and said reference signal can be generated with a starting point from the time that it takes for the counter to count through its states.

Alternatively, it is possible according to the present invention to make the value of a reading accessible to the first clock domain over a time period that corresponds to a full period of the first clock frequency, subsequent to having read the received signal.

Said value is made available by receiving said signal in a 2:1 multiplexer which forwards the received signal solely during said specific period, and which also forwards a feedback signal from itself at each other period.

According to the present invention, this feedback is made possible by receiving the signal forwarded from the multiplexer on a flip-flop, such as a D flip-flop, where the output signal of said flip-flop constitutes the received signal available to the first clock domain, and the signal fed back to the multiplexer. The flip-flop is clocked by the first clock frequency and the pulse generated by the counter forms the requisite multiplexer enable signal.

Advantages

The advantages afforded primarily by an inventive method and an inventive arrangement reside in enabling an asynchronous signal from one clock domain to be received in another clock domain without the risk of metastability in the receiving clock domain, even in those instances when the clock frequency in the receiving clock domain is so high as to prevent the use of traditional metastability processing methods.

An inventive solution also consumes much less power than traditional metastability solutions, by virtue of the fact that there is used in accordance with one preferred embodiment only one flip-flop, which is not subjected to metastability. According to another preferred embodiment there is used an AND-gate instead of a flip-flop, which further reduces the power required, this preferred embodiment being described in more detail hereinafter with reference to preferred embodiments. The present invention also provides means for generating the third clock frequency, which can also be used as a reference frequency for the second clock domain.

The primary characteristic features of an inventive method are set forth in the characterising clause of the accompanying claim 1, while the primary characteristic features of an inventive arrangement are set forth in the characterising clause of the accompanying claim 12.

BRIEF DESCRIPTION OF THE DRAWINGS

A method and an arrangement having features characteristic of the present invention will now be described by way of example and with reference to the accompanying drawings, in which.

DESCRIPTION OF PROPOSED EMBODIMENTS

Figure 1:
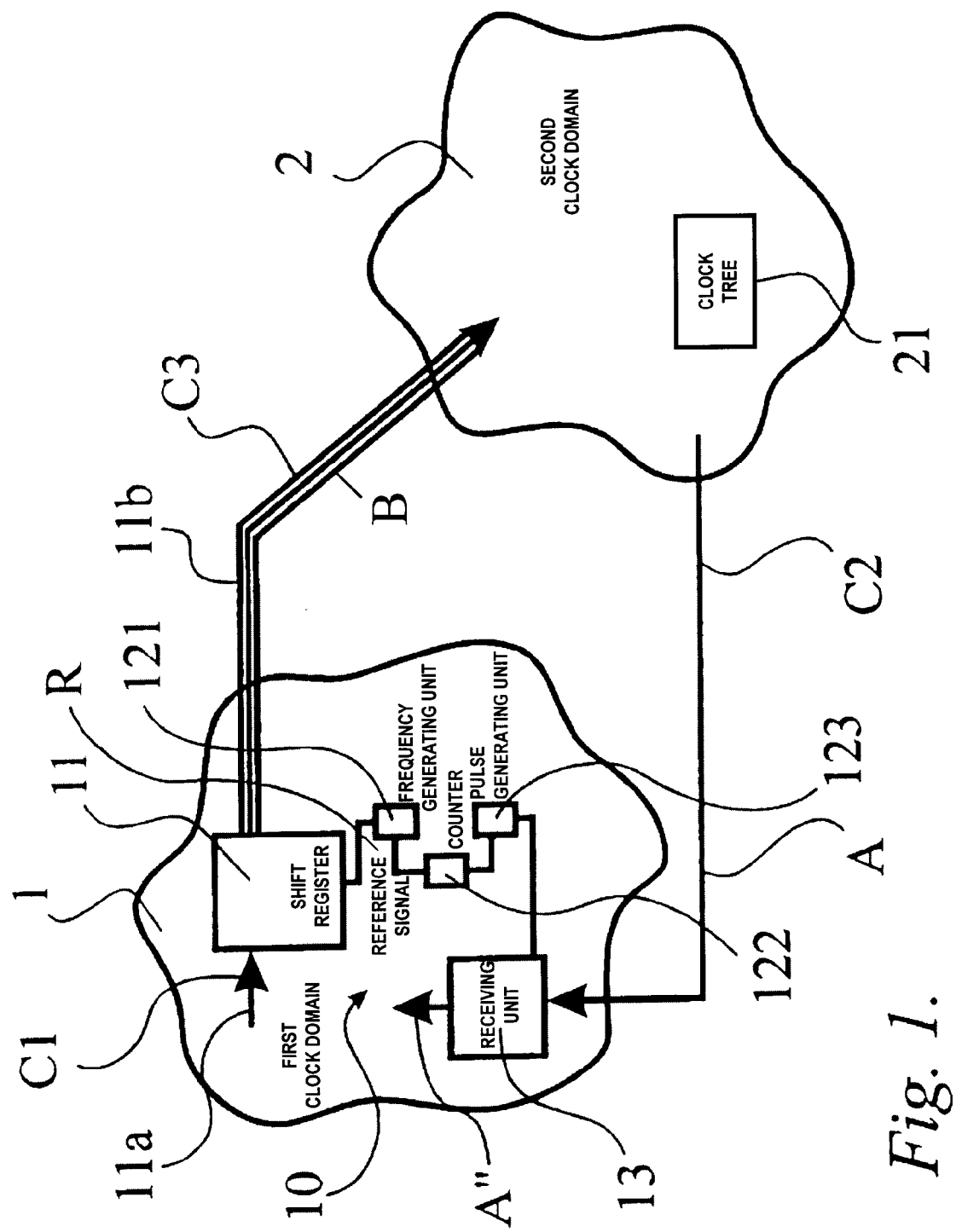
FIG. 1 illustrates schematically and very simply a first and a second clock domain and certain communications lines therebetween.

FIG. 1 thus illustrates a method of preventing metastability in conjunction with the receipt of an asynchronous digital signal A in a first clock domain 1 from a second clock domain 2.

The first clock domain 1 operates with a first clock frequency C1 and the second clock domain 2 operates with a second clock frequency C2, wherein the first clock frequency signal C1 is higher than the second clock frequency C2 in the illustrated case.

According to the prerequisite of the present invention, the second clock frequency 2 is known within the first clock domain 1, by virtue of accepting the received signal A with the second clock frequency C2.

A reference signal R generated in the first clock domain is used as a reference for the clock frequency that operates within the second clock domain 2. This reference signal has a known phase and frequency in the first clock domain. This phase information is also available in the received signal A, although with a degree of uncertainty.

The reference signal R can be used as a reference for the clock frequency C2 within the second clock domain 2, for instance by sending the information B sent from the first clock domain 1 to, the second clock domain 2 with a third clock frequency C3 which is comprised of or is derived from the reference signal R.

This is quite general in telecommunications contexts for instance, where the first clock domain 1 may comprise a network with transmission of information at high rates, such as 670 MHz, which constitutes the first clock frequency C1, and where the information to be handled in a telephone exchange unit, the second clock domain 2, operating at a clock frequency which is only one-tenth of the first clock frequency for instance, thus 67 MHz, constitutes the third clock frequency C3.

When transferring information from the first clock domain 1 to the second clock domain 2, the information is converted from serially transmitted information 11*a* to parallel transmitted information 11*b*, by means of a shift register 11. The information is then clocked into the second clock domain 2 with a reference frequency that is generated in the first clock domain 1. This reference frequency is comprised of the so-called third clock frequency C3.

FIG. 1 shows schematically that information incoming to the shift register 11 arrives on a single conductor 11*a* at a frequency according to the first clock frequency C1, and that outgoing information from the shift register 11, out of the first clock domain 1, exits from a plurality of parallel conductors 11*b* at a frequency according to the third clock frequency C3.

In the aforedescribed application, it may be necessary to send control information from the second clock domain 2 back to the first clock domain 1, for instance so as to control the parallel conversion and therewith ensure that data words will not be divided but will be sent into the second clock domain 2 as complete units.

This information is contained in the signal A sent from the second clock domain 2 to the first clock domain 1. Because of delays in the transmission between and within the two clock domains, and because of the depth of the clock tree 21 that operates within the second clock domain 2, some of the phase information from the reference signal R, or the third clock frequency C3, will be lost in the second clock frequency C2, depending how the signal A is transmitted.

Thus, we have called the clock frequency of the returning signal as a second clock frequency C2 which is equal to the known third clock frequency C3 with respect to frequency but which differs from the third clock frequency C3 with respect to phase with a degree of uncertainty.

The phase relationship between the second clock frequency and the third clock frequency is thus known with a certain degree of uncertainty, wherein this uncertainty may cause metastability when reading the received signal. It is known that the clock depth and delays cause a positive phase difference between the third and the second clock frequency, in other words $\upsilon_3 - \upsilon_2 > 0$, where $\upsilon_2$ is the phase of the second clock frequency C2 and $\upsilon_3$ is the phase of the third clock frequency C3.

Figure 2:
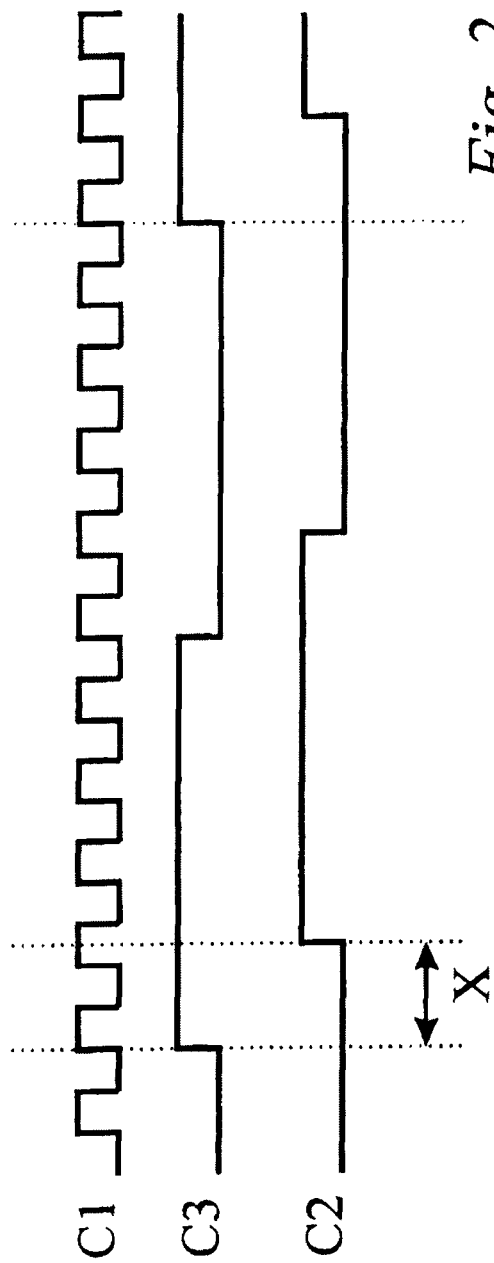
FIG. 2 illustrates schematically three different clock frequencies and a first mutual relationship therebetween.

FIG. 2 shows that the third clock frequency C3 is reduced by the first clock frequency C1 by a factor of 10. The reference signal R is generated in the first clock domain 1, for instance by reducing the first clock frequency C1, and is then sent to the second clock domain 2 as a clock signal C3.

Due to the delays in the second clock domain 2, there is an uncertainty X in the relationship between the second clock frequency C2, the frequency that the information A from the second clock domain has, and the generated reference signal R or the third clock frequency C3 when the information is received in the first clock domain 1. This uncertainty is system dependent and a maximum uncertainty value can be determined or evaluated on the basis of knowledge of system parameters in the two clock domains.

The high clock frequency, e.g. 670 MHz, in the first clock domain means that occurrent metastability will not only cause uncertainty in read values but that the metastability can also be spread into the first clock domain.

The present invention provides the possibility of finding a safe time period in which a received signal can be read without risking metastability in receiving circuits.

According to the present invention, there is utilised the fact that the second clock frequency C2 is known in the receiving first clock domain 1, and that the relationship between the first clock frequency 1 and the reference signal R and, with some uncertainty, the phase relationship between the third clock frequency C3, and therewith the reference signal R, and the second clock frequency C2 are known.

When it is known that the maximum value of the total uncertainty of the phase of the incoming signal A lies beneath a given value X, and provided that said value X is smaller than one period of the reference signal R, it is theoretically possible to know when the incoming information can be safely read.

Figure 3:
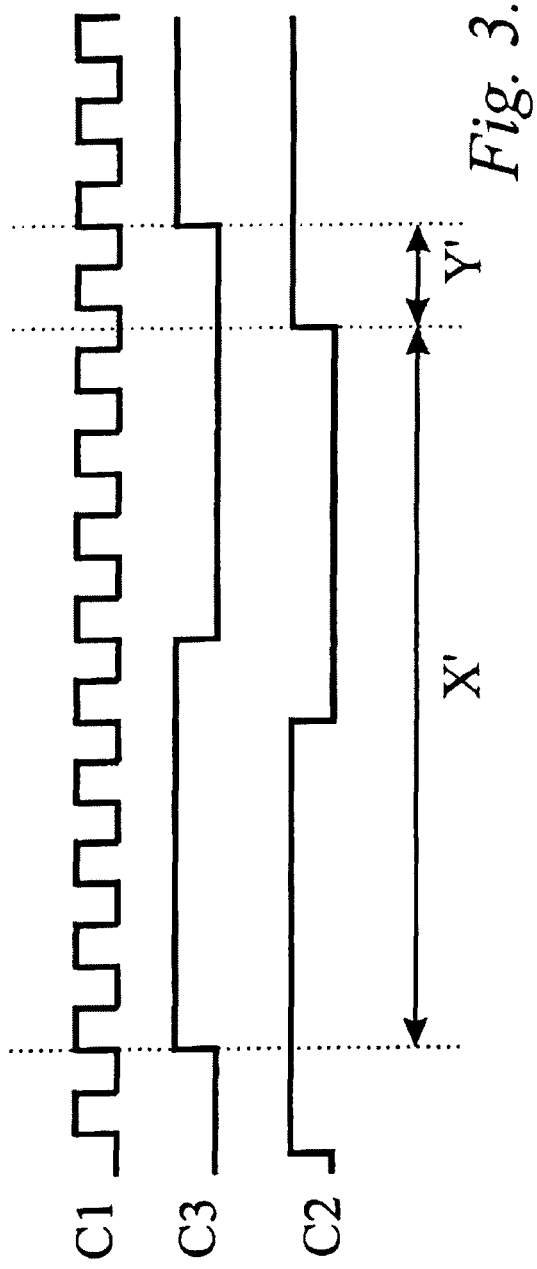
FIG. 3 illustrates schematically three different clock frequencies and a second mutual relationship therebetween.

FIG. 3 shows how the incoming signal is clocked with the second clock frequency C2 which is offset by X' by an extent such that only a small time interval Y' is found available before the offset, or displacement, reaches a full period of the third clock frequency C3. When the displacement is less than one period of the third clock frequency C3 minus a time period Y', said time period Y' will constitute a safe time period within which a correct value can be read from the incoming signal A.

The requisite duration of this safe time period Y' will depend on the application concerned and then primarily on the time required to read the received signal.

Figure 4:
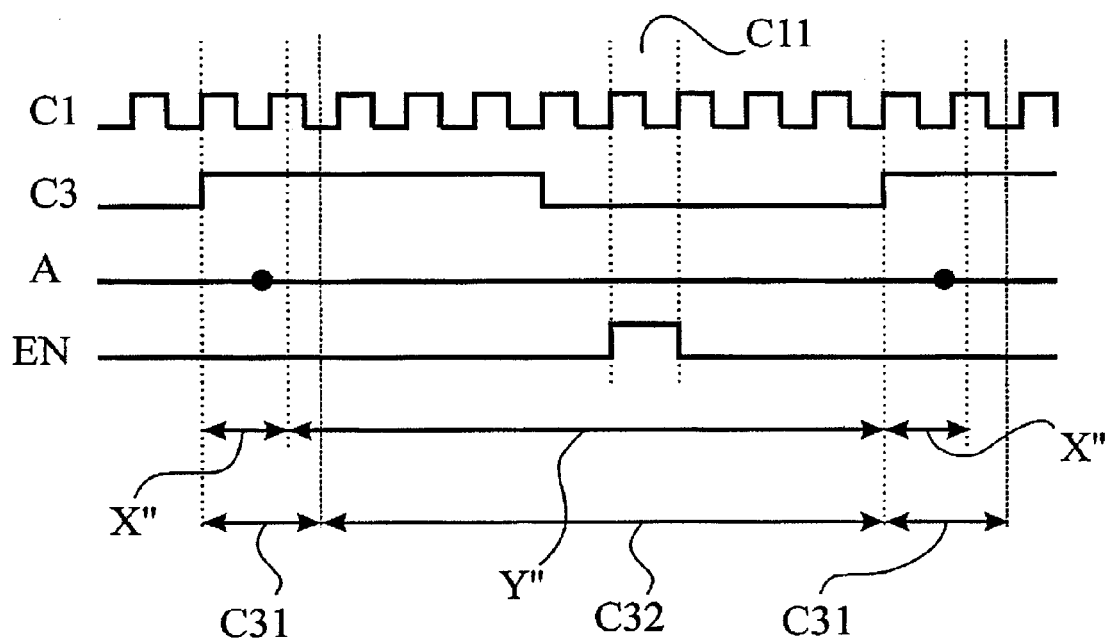
FIG. 4 illustrates schematically two clock frequencies and shows the uncertainty with respect to phase in the relationship to the third clock frequency, and also shows a generated pulse that denotes a safe time interval for reading a received signal.

The situation shown in FIG. 3 is an extreme situation, whereas the situation shown in FIG. 2 is more normal. FIG. 4 shows the same situation as that shown in FIG. 2, but with the transition between two bits in an incoming signal A shown schematically as a point that can occur anywhere within the uncertainty area X".

It is therefore safe to read the signal A somewhere in the time interval Y", where no transitions between the states of information bits within the information carrying signal A will take place.

According to the present invention, the knowledge of the magnitude of the uncertainty with respect to the phase difference between the second and third clock frequencies is utilized to find a safe time period in which the incoming signal A can be read.

This is made possible by dividing each period of the third clock frequency C3 into a first and a second part, where the first part C31 begins each period and is at least corresponded with respect to time by the uncertainty X" in the phase difference between the second and the third clock frequencies.

The second part C32 of the third clock frequency constitutes the remainder of each period.

According to the invention, the received signal shall be read during a specific period C11 of the first clock frequency C1 that falls within the second part C32.

This can be implemented by generating a pulse EN during the specific period C11, said pulse EN indicating when it is safe to read the value of the received signal A. The person skilled in this art will be aware that the time duration of the pulse EN need not necessarily be corresponded by a period according to the first clock frequency C1, even though this is the case in FIG. 4, but that said pulse may be shorter or longer in accordance with the application concerned in practice.

According to one preferred embodiment of the invention, a counter 122 functions to count through a number of states corresponding to the number of periods that the first clock frequency C1 is able to pass during one period of the third clock frequency C3, wherein the pulse EN is generated during a predetermined state of the counter 122.

For instance, a Johnsson counter having five bits counts through ten different states in time with the first clock frequency C1. Table 1 shows how ten different states can be counted through by a Johnsson counter.

TABLE 1

| State | Output signal |
|---|---|
| 1 | 00000 |
| 2 | 00001 |
| 3 | 00011 |
| 4 | 00111 |
| 5 | 01111 |
| 6 | 11111 |
| 7 | 11110 |
| 8 | 11100 |
| 9 | 11000 |
| 10 | 10000 |

According to the aforegoing, the reference signal R, and also the third clock frequency C3, are generated in the first clock domain 1, and the signal from the aforesaid counter 122 can be used to generate this reference signal, which can then be used as a reference for the clock frequency in the second clock domain 2.

For instance, the reference signal R may be implemented by allowing the transition from the fifth state to the sixth state (01111 to 11111) to form the positive edge of the reference signal R and the transition from the tenth state to the first state (10000 to 00000) to form the negative flank of said reference signal R, in other words allow bit 4 (the most significant bit when the least significant bit is defined as bit 0) to form the reference signal R.

According to the present invention, it is possible to allow a value obtained from one reading of a received signal A to be made available to the first clock domain during a time period that corresponds to a full period of the third clock frequency C3 subsequent to having read the signal.

Figure 5:
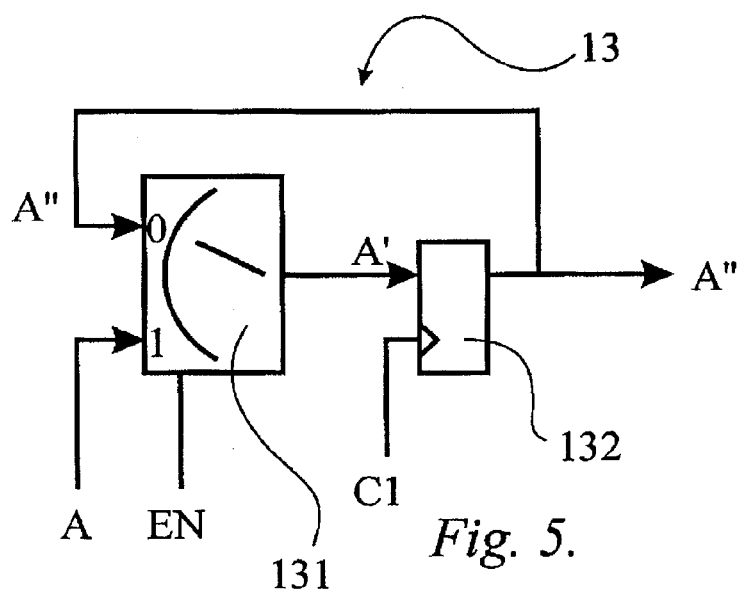
FIG. 5 is a schematic illustration of a first embodiment of a receiving unit that includes a multiplexer and a D flip-flop.

According to one preferred embodiment of the invention, and as shown in FIG. 5, this availability is made possible by receiving the received signal A in a multiplexer 131, a 2:1 multiplexer, which forwards A' the received signal solely during the specific period C11, in other words during the safe time period Y", and which forwards a feedback signal A" from itself at every other period.

This is implemented in practice by forwarding the signal A' from the multiplexer 131 to a flip-flop 132, for instance a D flip-flop. The output signal from this flip-flop 132 may form the received signal A" available to the first clock domain 1 and also the signal fed back to the multiplexer 131. The flip-flop 132 is clocked by the first clock frequency C1 and the generated pulse EN is allowed to form the requisite enable-signal for the multiplexer 131.

An alternative embodiment resides in making only one value obtained when reading said signal available to the first clock domain during a time period that corresponds to the time duration of, the pulse generated. When such a limitation can be accepted, it is possible to allow the signal to be received through solely one logic circuit, such as an AND-gate.

Figure 6:
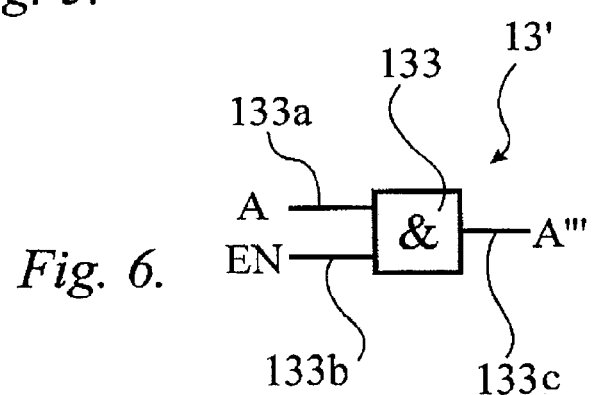
FIG. 6 illustrates schematically a second embodiment of a receiving unit that includes an AND-gate.

FIG. 6 shows how an AND-gate 133 can be adapted to receive the incoming signal A on a first input 133a, and to receive the generated pulse EN on a second input 133b, wherewith the output signal A'" from the AND-gate forms the received signal available to the first clock domain. The person skilled in this art will be aware that any other logic circuit may be used to receive an incoming signal, such as an OR-gate.

In this application, the first clock domain shall be adapted to read a received value from the AND-gate solely during the time period of the generated enabling pulse EN.

The present invention also relates to an arrangement that is adapted to operate in accordance with the aforedescribed method. The above description of the inventive method will be used as a basis for understanding this arrangement.

As illustrated in FIG. 1, the inventive arrangement 10 is adapted to prevent metastability in conjunction with the receipt of an asynchronous digital signal A in a first clock domain 1 which operates at a first clock frequency C1, said receivable signal A arriving from a second clock domain 2 which operates with a second clock frequency C2.

A frequency generating unit 121 operating in the first clock domain is adapted to generate a third clock frequency C3 which forms a reference signal R and which is used as a reference for the clock frequency that operates within the second clock domain 2. This reference signal has a known phase and frequency in the first clock domain, said phase information also being found available in the received signal A, although with some uncertainty.

The reference signal R can be used as a reference for the clock frequency C2 within the second clock domain 2, for instance by sending the information B sent from the first clock domain 1 to the second clock domain 2 as a third clock frequency C3 that is comprised of or derived from the reference signal R.

According to the present invention, each period of the third clock frequency C3 can be divided into a first and a second part, where the first part C31 corresponds, at least with respect to time, to, the uncertainty X" in the phase difference between the second and third clock frequencies according to FIG. 4.

The first part C31 begins each period and the second part C32 constitutes the remainder of each period.

The arrangement also includes a receiving unit 13 which is adapted to read the received signal A during a specific period C11 of the clock frequency C1 that falls in the second part C32 of each period of the third clock frequency C3.

According to FIG. 1, the arrangement 10 includes a counter 122 and a pulse generating unit 123 which, in combination with each other, function to generate a pulse EN during the specific period C11.

The counter 122 is adapted to count through a number of states, wherein said number of states is adapted to correspond to the number of periods that the first clock frequency C1 is able to pass during one period of the third clock frequency C3. The pulse generating unit 123 is adapted to generate a pulse EN during one specific state of the counter.

As illustrated in FIG. 1, the frequency generating unit 121 of an inventive arrangement 10 may be adapted to generate the reference signal R, and thereto also the third clock frequency C3, with a starting point from the time that it takes for the counter 122 to count through its states.

For instance, if the counter 122 is a Johnsson counter that counts in accordance with Table 1, the frequency generating unit 121 can allow the transition from the fifth state to the sixth state (01111 to 11111) to constitute the positive flank of the reference signal R and to allow the transition from the tenth state to the first state (10000 to 00000) to constitute the negative edge of the reference signal R, in other words to allow bit 4 (the most significant bit when the least significant bit is defined as bit 0) to form the reference signal R.

According to the present invention, the receiving unit 13 is adapted to make a value read from the signal A available to the first clock domain 1 during a time period that corresponds to a full period of the third clock frequency C3, after having read said value.

According to one preferred embodiment, this is made possible by including in the receiving unit 13 a multiplexer 131, a 2:1 multiplexer, which is adapted to accept the signal A.

This multiplexer 131 is adapted to forward A' the received signal solely during the specific period C11, and to forward a feedback signal A" from itself at each other period of the first clock frequency C1.

In the case of this embodiment, the receiving unit 13 includes a flip-flop 132, such as a D flip-flop, which is adapted to accept the signal A' forwarded from the second multiplexer 131.

The flip-flop 132 is adapted to transmit a received signal A" available to the first clock domain 1, said transmitted signal also constituting the signal A" that is fed back to the multiplexer 131.

The flip-flop 132 is adapted to be clocked by the first clock frequency C1, and the generated pulse EN is adapted to form the requisite enable-signal for the multiplexer 131.

The multiplexer 131 allows the incoming signal A to pass through when the enable-signal EN is a logic "one" and the feedback signal A" is allowed to pass through when the enable-signal EN is a logic "zero".

The flip-flop 132 transmits the value that was received during a preceding time interval of the first clock frequency C1. The flip-flop therewith delivers a correct received signal A" during a full period of the third clock frequency C3.

This means that the received signal A, or that the signal A' arriving at the flip-flop 132, must be stable at least prior to the negative flank of the enable-signal EN, meaning theoretically that the duration of the safe time interval, i.e. the second part Y" of the received signal, need only be sufficient to enable the negative flank of the enable-signal EN to have space with a given margin.

According to an alternative embodiment, an inventive receiving unit 13' may be adapted to make a value derived from reading of a received signal A available to the first clock domain during a time period that corresponds solely to the time duration of the generating pulse EN.

FIG. 6 illustrates an example of one such receiving unit 13' that includes an AND-gate 133. This AND-gate is adapted to receive the incoming signal A on a first input 133a and to receive the generated pulse EN on a second input 133b. The AND-gate functions to transmit on its output 133c a received signal A'" available to the first clock domain. Those skilled in this art will be aware that other gates, such as an OR gate, can be used to read received signals.

It will be understood that the invention is not restricted to the aforedescribed and illustrated exemplifying embodiments thereof and that modifications can be made within the scope of the inventive concept as illustrated in the accompanying claims,

What is claimed is:

1. A method of preventing metastability in conjunction with the receipt of an asynchronous digital signal in a first clock domain that operates with a first clock frequency, wherein the received asynchronous digital signal arrives from a second clock domain that operates with a second clock frequency that is known within the first clock domain, said method comprising the steps of:

sending information from the first clock domain to the second clock domain, said information including a reference signal containing phase information that is known in the first clock domain;

clocking the information into the second clock domain utilizing the phase information contained in the reference signal;

utilizing the phase information by the second clock domain to send the asynchronous digital signal to the first clock domain;

determining in the first clock domain, the phase information from the asynchronous digital signal with a known degree of maximum uncertainty that is less than one period of the reference signal; and stably reading the received asynchronous digital signal by the first dock domain.

2. The method of claim 1, further comprising generating a third clock frequency in the first clock domain, wherein the third clock frequency has a known phase and frequency relationship with the reference signal, and the uncertainty in the phase information consists of uncertainty in the phase relationship between the second clock frequency and the third clock frequency.

3. The method of claim 2, wherein the first clock frequency is higher than the third clock frequency, and the method further comprises the steps of:

dividing each period of the third clock frequency into a first part beginning each period and corresponding at least to the uncertainty, and a second part that constitutes a remainder of each period; and reading the received asynchronous digital signal during a specific period of the first clock frequency that falls within the second part of each period.

4. The method of claim 3, further comprising generating a pulse during the specific period of the first clock frequency.

5. The method of claim 4, further comprising counting through a number of states by a counter, wherein the number of states corresponds to the number of periods in accordance with the first clock frequency that are able to pass during one period of the third clock frequency, wherein the step of generating a pulse includes generating the pulse during one predetermined state of the counter.

6. The method of claim 5, further comprising generating the reference signal in the first clock domain utilizing as a starting point, the time at which the counter has counted through its states.

7. The method of claim 2, further comprising the steps of:

determining a value obtained by reading the received asynchronous digital signal; and making the value available to the first clock domain during a specific time period that corresponds to a full period of the third clock frequency after reading the received asynchronous digital signal.

8. The method of claim 7, wherein the step of making the value available to the first clock domain includes the steps of:
   receiving the asynchronous digital signal in a 2:1 multiplexer in the first clock domain; and
   forwarding the received asynchronous digital signal from the multiplexer to the first clock domain only during the specific time period corresponding to the full period of the third clock frequency after reading the asynchronous digital signal.

9. The method of claim 8, wherein the step of forwarding the received asynchronous digital signal from the multiplexer to the first clock domain includes forwarding the received asynchronous digital signal to the first clock domain via a flip-flop circuit, wherein the flip-flop circuit outputs the received asynchronous digital signal both as an input to the first clock domain and as a feedback signal fed back to the multiplexer, wherein the flip-flop circuit is clocked by the third clock frequency, and a pulse generated during the specific time period forms a requisite enable-signal for the multiplexer.

10. The method of claim 6, further comprising the steps of:
    determining a value obtained by reading the received asynchronous digital signal; and
    making the value available to the first clock domain during a time period that corresponds to the time duration of the generated pulse.

11. The method of claim 10, further comprising the steps of:
    receiving the asynchronous digital signal as a first input to an AND-gate logic circuit;
    receiving the generated pulse as a second input to the AND-gate logic circuit; and
    outputting the received asynchronous digital signal from the AND-gate logic circuit to the first clock domain; and
    adapting the first clock domain to read a value received from the AND-gate logic circuit only during the time period of the generated pulse.

12. An arrangement for preventing metastability in conjunction with the receipt of an asynchronous digital signal in a first clock domain that operates with a first clock frequency, wherein the received asynchronous digital signal arrives from a second clock domain that operates with a second clock frequency that is known within the first clock domain, said arrangement comprising:
    means for sending information from the first clock domain to the second clock domain, said information including a reference signal containing phase information that is known in the first clock domain;
    means for clocking the information into the second clock domain utilizing the phase information contained in the reference signal;
    means for utilizing the phase information by the second clock domain to send the asynchronous digital signal to the first clock domain; and
    a receiving unit in the first clock domain for receiving the asynchronous digital signal, said receiving unit including:
    means for determining the phase information from the asynchronous digital signal with a known degree of maximum uncertainty that is less than one period of the reference signal; and
    means for utilizing the phase information to stably read the received asynchronous digital signal by the first clock domain.

13. The arrangement of claim 12, further comprising a frequency generating unit in the first clock domain that generates a third clock frequency constituting the reference signal, wherein the third clock frequency is utilized to generate the second clock frequency, and the uncertainty in the phase information consists of uncertainty in the phase relationship between the second clock frequency and the third clock frequency.

14. The arrangement of claim 13, wherein the first clock frequency is higher than the third clock frequency, and the arrangement further comprises:
    means for dividing each period of the third clock frequency into a first part beginning each period and corresponding at least to the uncertainty, and a second part that constitutes a remainder of each period; and
    means for reading the received asynchronous digital signal during a specific period of the first clock frequency that falls within the second part of each period.

15. The arrangement of claim 14, further comprising a counter and a pulse generating unit which, in combination, function to generate a pulse during the specific period of the first clock frequency.

16. The arrangement of claim 15, wherein the counter is adapted to count through a number of states that correspond to the number of periods in accordance with the first clock frequency that are able to pass during one period of the third clock frequency, and the pulse generating unit generates the pulse during a predetermined state of the counter.

17. The arrangement of claim 16, further comprising a frequency generating unit that generates the reference signal, wherein the reference signal, and therewith also the third clock frequency, is generated with a starting point from the time taken for the counter to count through the states.

18. The arrangement of claim 13, wherein the receiving unit derives a value from reading the received asynchronous digital signal, and provides the value to the first clock domain during a time period that corresponds to a full period of the third clock frequency.

19. The arrangement of claim 18, wherein the receiving unit includes a 2:1 multiplexer that receives the asynchronous digital signal and forwards the received asynchronous digital signal to the first clock domain only during the specific period of the first clock frequency, said receiving unit returning a feedback signal to the multiplexer at each other period of the first clock frequency.

20. The arrangement of claim 19, wherein the receiving unit includes a flip-flop circuit that receives the received asynchronous digital signal forwarded from the multiplexer, wherein the flip-flop circuit outputs the received asynchronous digital signal both as an input to the first clock domain and as a feedback signal fed back to the multiplexer, wherein the flip-flop circuit is clocked by the third clock frequency, and a pulse generated during the specific period of the first clock frequency forms a requisite enable-signal for the multiplexer.

21. The arrangement of claim 15, wherein the receiving unit derives a value from reading the received asynchronous digital signal, and provides the value to the first clock domain during a time period that corresponds to the time duration of the generated pulse.

22. The arrangement of claim 21, wherein the receiving unit includes an AND-gate logic circuit that receives the received asynchronous digital signal as a first input, receives the generated pulse as a second input, and transmits the received asynchronous digital signal to the first clock domain, wherein the first clock domain is adapted to read a value received from the AND-gate logic circuit only during the time period of the generated pulse.

* * * * *